United States Patent Office 3,453,216
Patented July 1, 1969

3,453,216
URANIUM TRIOXIDE AQUASOL PROCESS
Frederick T. Fitch, Shaker Heights, Ohio, and Robert D. Shoup, Silver Spring, Md., assignors to W. R. Grace & Co., New York, N.Y., a corporation of Connecticut
No Drawing. Filed Mar. 15, 1967, Ser. No. 623,227
Int. Cl. C01g 43/02; G21c 3/42
U.S. Cl. 252—301.1                                   4 Claims

ABSTRACT OF THE DISCLOSURE

Uranium trioxide aquasols are made by heating ammonium diuranate to decompose it to anhydrous uranium trioxide, and hydrating the anhydrous uranium trioxide with sufficient water to form a concentration of up to 30 percent $UO_3$ in the mixture.

---

This invention relates to a process for forming colloidal uranium trioxide particles. More particularly, this invention is a process for preparing uranium trioxide aquasols comprising the steps of decomposing ammonium diuranate by heating at a temperature of from 200 to 450° C. to form anhydrous uranium trioxide, and hydrating the anhydrous uranium trioxide to colloidal uranium trioxide hydrate particles in a mixture with sufficient water to form a concentration of up to 30 weight percent $UO_3$ in the mixture. The aquasol can be dried to form colloidal uranium trioxide powders.

Uranium oxide sols are of prime importance in the preparation of ceramic nuclear reactor fuel elements. Fuel elements prepared from sols have the advantage of higher mechanical strength and lower sintering temperatures than those produced from conventional ceramic powders. Methods for producing sintered microspheres from uranium dioxide sol particles have been previously described. In one of these methods, a uranium dioxide aquasol is dispersed in an immiscible dehydrating solvent and dried, producing uranium dioxide microspheres. The microspheres are then reduced and sintered to near theoretical density by heating at temperatures above about 1200° C. in an atmosphere of an inert or reducing gas.

It is the object of this invention to provide a new method for making uranium trioxide aquasols which is more direct and less expensive than previously known methods.

The starting material in the process of this invention is ammonium diuranate. This material is readily available from the initial steps in most uranium processing operations. It can be easily obtained by reacting ammonia with a solution of a uranyl salt such as a halide salt, precipitating ammonium diuranate according to the following equation:

$$2UO_2Cl_2 + 6NH_3 + 3H_2O \rightarrow (NH_4)_2U_2O_7 + 4NH_4Cl$$

Ammonium diuranate can be prepared from other uranium salts such as uranyl nitrate, fluoride, and the like. The precipitated ammonium diuranate is washed free of salt impurities.

The first step in the process of this invention comprises decomposing ammonium diuranate by heating it at a temperature of from 200 to 450° C. and preferably from 250 to 400° C. to form anhydrous uranium trioxide according to the following equation:

$$(NH_4)_2U_2O_7 \xrightarrow{\text{Heat}} 2UO_3 + 2NH_3 + H_2O$$

Decomposition of the ammonium diuranate to anhydrous uranium trioxide is substantially complete after heating for about 4 hours at 250° C., for example. Shorter times are required at higher temperatures.

The anhydrous uranium trioxide is mixed with water which is preferably deionized. Because the viscosity of the final product increases with increasing metal oxide concentrations, the practical concentration limit of the uranium trioxide in the mixture is about 30 weight percent. The uranium trioxide concentration in the mixture is preferably from 0.1 to 20 weight percent.

The uranium trioxide is then hydrated to colloidal uranium trioxide particles according to the following equation, $$UO_3 + 2H_2O \rightarrow UO_3 \cdot 2H_2O \text{ (colloidal)}$$

Hydration will occur if the water is in the liquid phase during the reaction period, that is when the mixture has a temperature of from about 0 to 100° C. at atmospheric pressure. Higher temperatures can be used if the slurry is maintained under sufficient pressure to keep the water in the liquid state. The temperature of the mixture during the hydration reaction is preferably around room temperature. Physical agitation of the aqueous slurry is preferably used to promote hydration. Agitation is preferably continued until anhydrous uranium trioxide is converted to colloidal uranium trioxide hydrate particles.

The slurry can be agitated by any suitable means such as by intermittent or continuous high-speed stirring, shearing, ultrasonic vibrations, ball milling or colloid milling.

The uranium trioxide aquasols formed by the process of this invention have pH values ranging from 4.5 to 8.5 and preferably from 4.5 to 6. The sol particles are round platelets and have a size of from 30 to 300 millimicrons.

Dry uranium trioxide hydrate powders can be formed from the aquasols by evaporation or solvent drying.

The sol pH was measured with a Beckman Model G pH meter, and the specific conductance was measured with Industrial Instruments conductivity bridge, Model RC 16 B1.

This invention is further illustrated by the following specific, but non-limiting examples.

EXAMPLE 1

Ammonium diuranate was precipitated from a uranyl chloride solution by adding an excess of an ammonium hydroxide solution with stirring. The ammonium diuranate precipitate was filtered from the reaction mixture and washed free of salt impurites with deionized water.

The washed filter cake was heated in an oven at 250° C. for four hours during which time the ammonium diuranate decomposed to anhydrous uranium trioxide. Fifty grams of the anhydrous uranium trioxide was mixed with 250 ml. of distilled water, and the mixture was subjected to strong agitation in a Waring Blendor. This vigorous mechanical mixing was performed intermittently for from 5 to 10 minutes during each hour for a total of 6 hours. A uniform yellow uranium trioxide dihydrate sol was produced. The sol had a slight tendency to settle over a 24 hour period but was readily dispersed. The hydrated uranium trioxide aquasol product contained approximately 10 weight percent $UO_3$, and had a pH of 5.0 and a specific conductance of $2.4 \times 10^{-4}$ mho/cm. at 25° C.

This procedure was repeated to form other uranium tioxide hydrate sols from anhydrous uranium trioxide produced by heating ammonium diuranate at temperatures ranging from 250 to 350° C. for at least 4 hours. Ammonium diuranate precipitated with ammonia from uranyl fluoride and uranyl nitrate solutions was also used.

EXAMPLE 2

This example shows sol formation from uranium diuranate decomposed at a higher temperature.

Washed ammonium diuranate formed by the procedure of Example 1 was heated in an oven at 350° C. for about 4 hours to decompose it to anhydrous $UO_3$. A 50 g. portion of pulverized $UO_3$ powder was placed in 450 ml. of deionized water at room temperature and the mixture was vigorously agitated in a Waring Blendor. The agitation was repeated for 5 to 10 minute periods each hour for a total of 6 hours.

A uniform yellow uranium trioxide hydrate sol having a slight tendency to settle over a 24 hour period was produced. The final sol contained 10 weight percent $UO_3$, and had a pH of 5.3 and a specific conductance of $1.94 \times 10^{-4}$ mho/cm. at 25° C.

Obviously, many modifications and variations of the invention as hereinabove set forth can be made without departing from the essence and scope thereof, and only such limitations should be applied as are indicated in the claims.

We claim:
1. A process for preparing colloidal uranium trioxide comprising the steps of:
   (a) decomposing ammonium diuranate to anhydrous uranium trioxide by heating at a temperature of from about 200 to 450° C.,
   (b) mixing the anhydrous uranium trioxide with sufficient water to provide a concentration of up to 30 weight percent $UO_3$ in the mixture, and
   (c) recovering an aquasol of colloidal uranium trioxide hydrate particles.

2. The process of claim 1 wherein the aquasol is dried to produce a powder of colloidal uranium trioxide hydrate.

3. The process of claim 1 wherein the hydration is promoted by physically agitating the mixture of anhydrous uranium trioxide and water.

4. The process of claim 1 wherein the ammonium diuranate is decomposed by heating at a temperature of from about 250 to 400° C.

References Cited

UNITED STATES PATENTS

| 3,024,199 | 3/1962 | Pasfield | 252—301.1 X |
| 3,189,555 | 6/1965 | Smith et al. | 252—301.1 |
| 3,272,602 | 9/1966 | Suehiro et al. | 23—354 |
| 3,281,373 | 10/1966 | Smith et al. | 252—301.1 |
| 3,288,717 | 11/1966 | Morse | 252—301.1 |
| 3,312,629 | 4/1967 | Smith | 252—301.1 |
| 3,326,812 | 6/1967 | Smith et al. | 252—301.1 |
| 3,326,813 | 6/1967 | Fitch et al. | 252—301.1 |
| 3,342,562 | 9/1967 | St. Pierre | 23—354 X |

LELAND A. SEBASTIAN, *Primary Examiner.*

M. J. SCOLNIK, *Assistant Examiner.*

U.S. Cl. X.R.

23—354